United States Patent Office 3,473,631
Patented Oct. 21, 1969

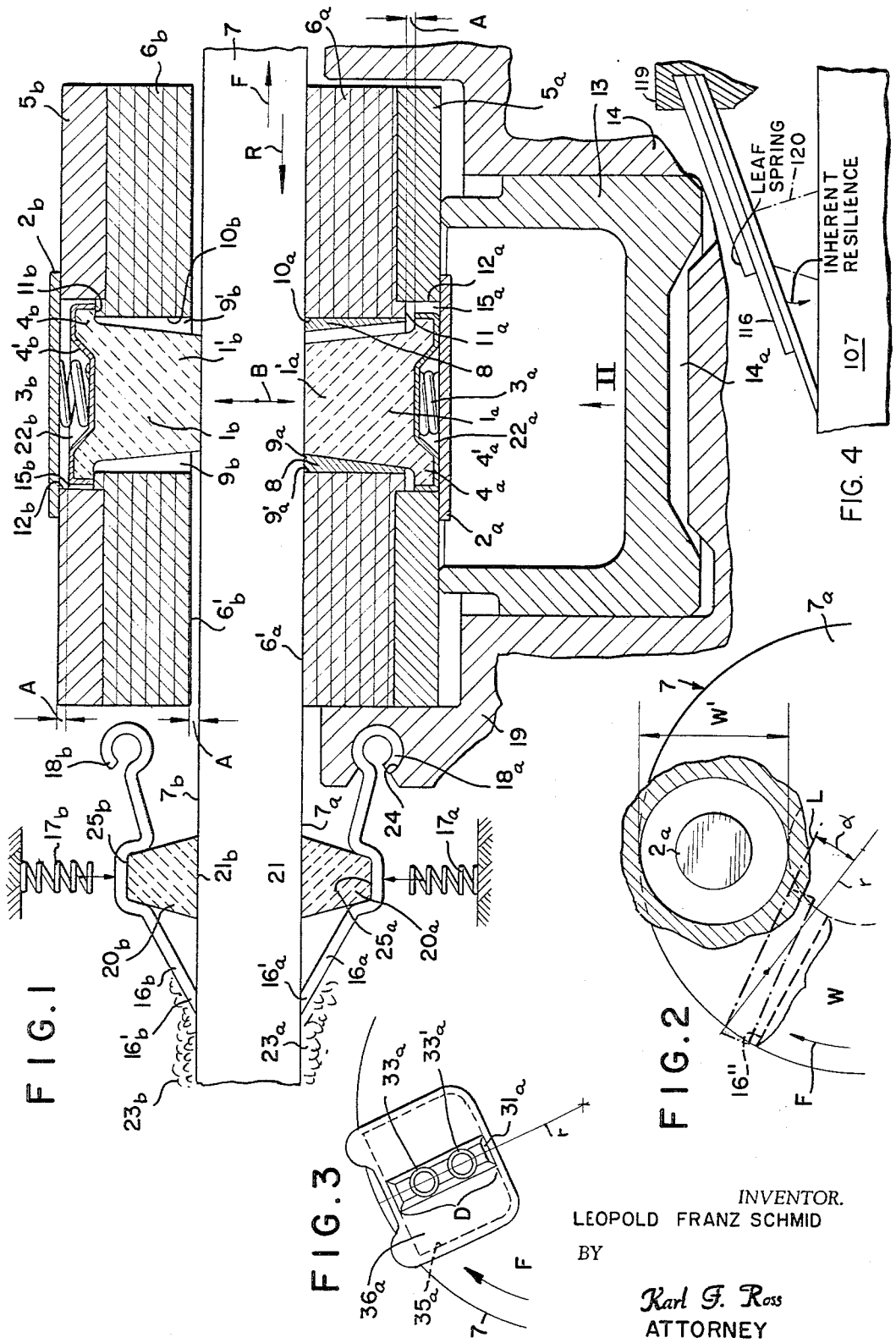

3,473,631
DISK BRAKE AND DISK CLEANING MEANS
Leopold Franz Schmid, Stuttgart, Germany, assignor to Alfred Teves G.m.b.H., Frankfurt am Main, Germany, a corporation of Germany
Filed Feb. 20, 1968, Ser. No. 706,841
Claims priority, application Germany, Feb. 27, 1967, T 33,288
Int. Cl. F16d 55/00, 65/00
U.S. Cl. 188—73                                    15 Claims

ABSTRACT OF THE DISCLOSURE

A disk brake for a vehicle adapted to travel through muddy and dusty terrains in which, within each of the hydraulically or mechanically actuated brakeshoes, a respective polishing and spaced body is mounted and is springloaded against the disk. The spring reacts against the brakeshoe to hold the brakeshoe away from the disk in operative condition of the brake while the polishing body bears radially against the direction to remove traces of contaminants therefrom. A scraper blade is provided ahead of the brakeshoe to remove gross layers of contaminants and holds a further polishing body resiliently against the disk.

---

My present invention relates to a disk brake for automotive vehicles and, more particularly, to improvements in disk-brake assemblies for cross-country automotive vehicles of high load-carrying capacity, e.g. trucks, semi-tracked vehicles and the like.

In general, a disk brake for an automotive vehicle may be considered to comprise a disk rotatably coupled with a vehicle wheel and having a pair of annular brake faces along opposite sides of the disk for engagement by respective brakeshoes of limited angular extent which are mounted in a yoke extending around the periphery of the disk. The brakeshoes may be urged by hydraulic or mechanical means axially against the flanks of the disk. Such systems have been found to be highly effective in rapid braking of the vehicle and are particularly desirable because of low cost of the brake structure, the short response time thereof, the low fluid-displacement volume and foot pressure necessary to actuate the brakes, etc.

Prior disk-brake systems have not, however, been successfully applied to overland or cross-country vehicles which are exposed to dust, sand, moisture and other gritty contaminants since the disk often becomes coated with such contaminants which alter the brake characteristics and may cause deterioration of the brakeshoes. Thus, for example, passage through puddles and patches of mud may cause sand particles to adhere strongly to the brake surfaces of the disk, the sand particles having sharp edges which cause a lapping or abrading of the brake lining. As a consequence, overland or cross-country vehicles, especially high-load trucks and the like, which frequently pass through muddy or dusty terrains, require replacement of brake linings after the relatively low useful life of 100–200 km.

It is, therefore, the principal object of the present invention to provide a disk-brake construction which will obviate the aforementioned disadvantages and permit the use of disk brakes for long periods on load-carrying vehicles for use in muddy and dusty terrains.

Another object of this invention is to provide a brake assembly capable of increasing the effective life of the brake lining of a disk-type brake.

It has been found that the disadvantages enumerated above can be obviated by providing the brakeshoes with respective stripper members engageable with the surface of the disk upon advance of the brakeshoes or prior to such advance under a relatively light pressure ahead of contact of the braking face of the lining with the disk which serves to scrape or otherwise remove contaminants (e.g. adherent dust particles) prior to effective brake. More specifically, this invention provides for a stripper member carried by the brakeshoe and lightly biased against the disk which, on the one hand, serves as a spacer retaining the brakeshoes out of engagement with the disk and, on the other hand, scrapes the surface of the disk free of contaminants. To this end, the scraper member may be mounted with a lost motion in the brakeshoe and can have spring means seated against the brakeshoe and biasing the scraper member against the disk. The scraper, which has a radial width (in terms of the axis of the disk and the annular braking faces) equal to that of the brakeshoe, may comprise a polishing body which serves as a final cleaning member for the surfaces of the disk, a bladelike scraper being disposed ahead of the brakeshoes or upstream therefrom in the direction of rotation of the disk at least in the forward direction of the vehicle.

Another structural aspect of the spacer is its shape as a body of revolution which is received within a bore extending centrally through the brakeshoe. In this case, the spacer body may be received with annular clearance and, when an alternative shape is required, the flanks of the spacer may be provided with clearances to accommodate circumferential play of the scraper in one or the other direction depending upon the direction of movement of the disk. The device thus serves to retain the effective faces of the brakeshoes away from the disk when the brake is not actuated, thereby preventing wear of the linings.

The above and other objects, features and advantages of the present invention will become apparent from the following description, reference being made to the accompanying drawing, in which:

FIG. 1 is a plan view of the disk brake embodying the present invention, with the parts pertinent to the present improvement being shown in axial cross-section;

FIG. 2 is a view taken generally in the direction II of FIG. 1;

FIG. 3 is a view similar to that of FIG. 2, illustrating a modification of this invention; and FIG. 4 is a detail view of a modification.

In FIGS. 1 and 2 of the drawing, I show a vehicle disk brake whose disk 7 is coupled with an automotive vehicle wheel in the usual manner while the yoke 19 of the brake extends around the periphery of the disk and is anchored to the axle housing. A typical brake construction of this nature is shown in the commonly assigned application Ser. No. 680,831, filed Nov. 6, 1967 (now U.S. Patent No. 3,424,282). The annular braking faces 7a and 7b on opposite sides of the disk 7 are confronted by brake linings 6a and 6b of respective brakeshoes whose balking plates 5a and 5b respectively carry the linings. The brake linings 6a and 6b are formed centrally with cylindrical bores 10a and 10b which receive with clearance the frustoconical mushroom-like scraper bodies 1a and 1b whose heads 4a and 4b, remote from the surfaces 7a and 7b, overhang the shoulders 11a, 11b formed around the bores 10a and 10b by the brake lining material 6a and 6b.

The annular clearances 9a and 9b are generally frustoconical and converge away from the surfaces 7a and 7b respectively and are provided so that burrs from along the inner edges 9a′ and 9b′ do not limit the axial movement of the bodies 1a and 1b in the direction of arrow B. The backing plates 5a and 5B of the brakeshoes are provided with respective bores 12a and 12b coaxially registering with the bores 10a and 10b and surround the heads 4a and 4b of the bodies 1a and 1b with the annular clearances 15a and 15b. Bores 15a, 15b are of a diameter greater than that of the bores 10a and 10b so as to define, along the lining 6a and 6b surrounding the bodies 1a and 1b, the respective shoulders 11a, 11b overhung by the heads 4a and 4b. The play at 15a, 15b permits the bodies 1a and 1b to be shifted to the left or right during the reverse movement of the vehicle (arrow R) and in the forward direction (arrow F) during forward movement of the vehicle upon application of the brakes. The body 1a is shown in its shifted position for reverse movement of the vehicle. This motion allows the shank 1a' or 1b' of the scraper bodies to withdraw from the accumulations 8 of polishing dust and contaminants which fill the annular clearances 9a and 9b surrounding the bodies. The convergence of the shanks 1a' and 1b' of these bodies in the direction of the braking faces 7a and 7b of the disk constitutes a "draft" permitting forward movement of the brakeshoe 5a, 6a and 5b, 6b in spite of the fact that the clearances may be packed with contaminants.

Spring means in the form of individual coil springs 3a and 3b are provided between abutment plates 2a and 2b overlying the backing plates 5a and 5b to urge the bodies 1a and 1b, which have wear-resistant hoods or caps at 4a', 4b' to prevent mechanical destruction of the polishing bodies. Springs 3a and 3b must have a force constant or strength sufficient to urge the bodies 1a, 1b ahead of the braking faces 6a', 6b' of the corresponding linings and thus hold the surfaces away from the braking faces 7a and 7b of the disk as shown for the brakeshoe 5b, 6b in FIG. 1.

During brake operation, e.g. by the introduction of a brake fluid into the working compartment 14a of a wheel-brake cylinder 14, the piston 13 is shifted toward the respective face 7a or 7b of the disk and bears directly upon the respective backing plate 5a, 5b to drive the associated brakeshoes against the disk (as shown for the brakeshoe 5a, 6a of FIG. 1. The coil spring (e.g. spring 3a) is compressed as the braking face 6a' advances to coplanarity of the face of shank 1a' and into engagement with the disk. The heads 4a and 4b of the bodies 1a and 1b are provided with outwardly concave recesses 22a, 22b in which the springs 3a and 3b are received so that the heads 4a and 4b are engaged by the plates 2a and 2b (which are welded to the backing plates). The elements 1a and 1b are thus advanced positively by the brakeshoes to continue the polishing action, thereby ensuring equivalent wear of the members 1a and 1b and the brake linings. However, the heads 4a and 4b of members 1a and 1b have axial spacing from the plates 2a and 2b in the retracted position of the brakeshoe which is equal to the distance A between the braking face of the brakeshoe and the disk (as shown for the brakeshoe 5b, 6b in FIG. 1), thereby ensuring that the shanks 1a' and 1b' will have an axial length greater than the distance from the shoulders 11a, 11b from the respective brake face 6a', 6b'. The bodies 1a and 1b can be constructed of a material similar to that of the brake linings although they preferably have greater wear resistance and reduced frictional coefficient. Pumice and like bodies of ceramic may be employed.

On the upstream side of each of the brakeshoes 5a, 6a and 5b, 6b (with reference to the direction of normal rotation of the disk 7, i.e. corresponding to forward movement of the vehicle as represented by arrow F), I provide a further contaminant-stripping element shown as a blade 16a and 16b which has a scraping edge 16a' or 16b' bearing against the respective annular braking face 7a or 7b of the disk and held thereagainst by respective springs 17a and 17b shown diagrammatically. The contaminant layer scraped off the disk 7 is represented at 23a and 23b.

The blades 16a and 16b have extremities 18a and 18b which are pivotally or hingedly mounted in the housing 19, e.g. in cylindrical seats as shown at 24. The edges 16a' and 16b' extend radially with respect to the disk, e.g. along the dot-dash line shown at 16a in FIG. 2. While the system of FIG. 1 is provided with compression springs 17a, 17b for applying the blades lightly against the disk, it is also possible, alternatively or in addition to spring-load these blades, e.g. as leaf springs in the recesses 24, and have them bear against the disk without auxiliary springs by virtue of their inherent resiliency (FIG. 4). The blades 16a' and 16b' have a radial width W at least equal to the radial width W' of the brakeshoe so that the entire effective surface 7a or 7b at which the disk may be engaged between brakeshoes 5a, 6a or 5b, 6b is scraped by the blades. It will be understood, of course, that corresponding blades may be provided on the opposite side (diametrically with respect to the wheel-brake cylinder 14) to scrape the disk 7 when it is rotated in the opposite sense (arrow R).

Each of the blades 16a, 16b, etc. is provided with a respective polishing body 20a or 20b which is disposed between the blade edge 16a' or 16b' and the respective brakeshoe 5a, 6a or 5b, 6b to further insure complete clearing of the surfaces 7a and 7b of any contaminants. These polishing bodies have the cross section, as illustrated in FIG. 1, of a trapezoid with a broad base 21a or 21b bearing against the brake faces 7a or 7b, while the flanks of the trapezoid converge away from the disk to constitute of the bodies respective prisms (trapeziums) whose narrow sides are received in socket 25a, 25b formed in the blades 16a and 16b. The bodies 20a and 20b may be composed of a material similar to that or the brake lining 6a, 6b and/or the earlier-described scraper bodies 1a, 1b (e.g. a ceramic sintered from particles of an abrasive material such as pumice) although these bodies preferably have a greater wear resistance and a reduced frictional coefficient by comparison with the brake lining 6a and 6b.

The blades 16a and 16b urge the polishing bodies 20a and 20b against the disk with the resilient force of spring 17a, 17b or the inherent resiliency of the leaf spring constituting the blades. The outward convergence of the bodies 20a and 20b insure a continuously decreasing contact surface area as the bodies are subject to wear, the spring pressure similarly declining as the blades approach the disk. The specific loading, i.e., force per unit area of contact surface, thus remains the same until the bodies are completely worn. The longitudinal axis of the bodies 20a and 20b are represented by the dot-dash line L and define with the radius $r$ of the disk through the center of the body an acute angle $\alpha$ which may range from 15 to 75°. In FIG. 3 the overall construction is the same except that a pair of springs 33a, 33a' urge an elongated trapezoidal body 31a within a slot of the brakeshoes 35a, 36a against the disk 37a. The polishing body 31a here lies along a radius of the disk 37a and has a width D equal to the corresponding dimension of the brake lining 35a. Scraper member 16a, etc. are provided in the brake yoke as described with respective FIGS. 1 and 2 and the cross section of the scraper body 31a corresponding to the cross section of FIG. 1. The scraper may be a leaf spring 116 held by inherent elasticity against the disk 107 and may carry a polishing body 120 while being anchored in housing 119 (FIG. 4).

The invention described and illustrated is believed to admit of many modifications within the ability of persons skilled in the art.

I claim:
1. In a disk-brake system for an automotive vehicle whose rotatable brake disk is subject to contamination along annular brake faces and which is provided with a pair of brakeshoes shiftable in the direction of the disk by actuating means in a brake housing, the improvement wherein at least one of said brakeshoes is provided with a contaminant-stripping body movable relatively to the brakeshoe and acting thereon to retain one of said brake- shoes out of engagement with said disk in a nonactuated condition of the brakek, said system comprising resilient means between said one of said brakeshoes and said body for urging said body continuously against said disk while yieldably retaining one of said brakeshoes out of engagement therewith; and a scraper blade mounted on said housing and bearing upon said disk upstream of said body in the direction of rotation of said disk and resiliently biased against said disk, said scraper blade having a width upon engagement with said disk at least equal to the corresponding dimension of said one of said brakeshoes at its surface engageable with said disk.

2. The improvement defined in claim 1 wherein said body has a radial width substantially equal to the corresponding dimension of said one of said brakeshoes at its surface engageable with said disk.

3. The improvement defined in claim 1 wherein said blade forms a leaf spring biased against said disk by its inherent resiliency.

4. The improvement defined in claim 1, further comprising spring means urging said blade against said disk.

5. The improvement defined in claim 1 wherein said blade has a scraping edge lying generally along a radius of said disk.

6. The improvement defined in claim 1 wherein said blade converges from said housing toward said disk.

7. The improvement defined in claim 1 wherein said body is received in said one of said brakeshoes with play in the direction of rotation of said disk.

8. The improvement defined in claim 1 wherein said body converges in the direction of said disk.

9. The improvement defined in claim 1 wherein said body has generally a mushroom-shaped cross-section and has a head forming a lost-motion linkage with said one of said brakeshoes.

10. The improvement defined in claim 1 wherein said body is composed of a material having a wear resistance greater than that of the brakeshoe surfaces engageable with said disk and a lower coefficient of friction.

11. The improvement defined in claim 1, further comprising a polishing block mounted on said blade and bearing against the surface of said disk engaged by said blade between a scraping edge of said blade and said one of said brakeshoes.

12. The improvement defined in claim 11 wherein said body is generally a trapezoidal prism with a broad base engaging said disk and flanks converging away from said disk.

13. The improvement defined in claim 12 wherein said block has a longitudinal axis including an acute angle with a radius of said disk through the center of said block.

14. In a disk-brake system for an automotive vehicle whose rotatable brake disk is subject to contamination along annular brake faces and which is provided with a pair of brakeshoes shiftable in the direction of the disk by actuating means in a brake housing, the improvement wherein at least one of said brakeshoes is provided with a contaminant-stripping body movable relatively to the brakeshoe and acting thereon to retain one of said brakeshoes out of engagement with said disk in a nonactuated condition of the brake, said system comprising a scraper blade mounted on said housing and bearing upon said disk upstream of said body in the direction of rotation of said disk and resiliently biased against said disk, said scraper blade having a width upon engagement with said disk at least equal to the corresponding dimension of said one of said brakeshoes at its surface engageable with said disk.

15. The improvement defined in claim 14 wherein said body has a radial width substantially equal to the corresponding dimension of said one of said brakeshoes at its surface engageable with said disk.

References Cited

UNITED STATES PATENTS 2,496,699  2/1950  Clark _____ 188—734 XR
2,713,923  7/1955  Ekserjian et al.

GEORGE E. A. HALVOSA, Primary Examiner